(12) United States Patent
Klaassen et al.

(10) Patent No.: US 12,163,503 B2
(45) Date of Patent: Dec. 10, 2024

(54) COUPLING ASSEMBLY AND METHOD OF DRIVING A MONOPILE

(71) Applicant: Siemens Gamesa Renewable Energy A/S, Brande (DK)

(72) Inventors: Jacobus Klaassen, Voorburg (NL); Erwin de Jong, The Hague (NL)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/533,727

(22) Filed: Nov. 23, 2021

(65) Prior Publication Data

US 2022/0195988 A1 Jun. 23, 2022

(30) Foreign Application Priority Data

Dec. 23, 2020 (EP) .................................... 20216807

(51) Int. Cl.
*F03D 13/10* (2016.01)
*E04H 12/08* (2006.01)
*F03D 13/20* (2016.01)
*F03D 13/25* (2016.01)

(52) U.S. Cl.
CPC ........... *F03D 13/10* (2016.05); *E04H 12/085* (2013.01); *F03D 13/22* (2016.05); *F03D 13/25* (2016.05)

(58) Field of Classification Search
CPC ...... F03D 13/22; F03D 13/25; F05D 2230/60; E04H 12/085
See application file for complete search history.

(56) References Cited

U.S. PATENT DOCUMENTS

| | | | |
|---|---|---|---|
| 9,518,563 B2 * | 12/2016 | Ollgaard | E04H 12/085 |
| 10,669,993 B2 * | 6/2020 | Cooper | E02D 27/425 |
| 2009/0000227 A1 | 1/2009 | Jakubowski et al. | |
| 2010/0307097 A1 * | 12/2010 | Word, III | E04H 12/085 |
| | | | 52/651.07 |
| 2011/0154757 A1 * | 6/2011 | Rosengren | F03D 13/20 |
| | | | 52/651.01 |
| 2013/0180199 A1 | 7/2013 | Vadlamudi et al. | |
| 2014/0230343 A1 * | 8/2014 | Lam | F03D 13/20 |
| | | | 52/40 |
| 2014/0298737 A1 | 10/2014 | Fernandez Gomez et al. | |
| 2015/0096240 A1 | 4/2015 | Arlab Gabeiras et al. | |

(Continued)

FOREIGN PATENT DOCUMENTS

| | | |
|---|---|---|
| CN | 102076920 A | 5/2011 |
| CN | 102224301 A | 10/2011 |

(Continued)

*Primary Examiner* — Andrew J Triggs
(74) *Attorney, Agent, or Firm* — Schmeiser, Olsen & Watts LLP

(57) ABSTRACT

Provided is a coupling assembly for connecting a tower or a transition piece of a wind turbine to a monopile including a first coupling part configured to be connected to the monopile and a second coupling part configured to be connected to the first coupling part. Further provided is a tower end of a tower of a wind turbine connected to a second coupling part of the coupling assembly. Finally, a method of driving a monopile of a wind turbine into the ground, a top end of the monopile being connected to a first coupling part of the coupling assembly is also provided.

19 Claims, 8 Drawing Sheets

(56) References Cited

U.S. PATENT DOCUMENTS

| | | | | |
|---|---|---|---|---|
| 2016/0130779 A1* | 5/2016 | Van Dijk | ................ | E04H 12/00 |
| | | | | 405/228 |
| 2016/0251818 A1* | 9/2016 | Thomsen | .............. | E02D 27/425 |
| | | | | 52/297 |
| 2022/0002990 A1* | 1/2022 | Klaassen | ................ | E04H 12/342 |
| 2022/0003344 A1* | 1/2022 | Klaassen | ................ | F16L 23/032 |
| 2022/0145657 A1* | 5/2022 | Klaassen | ................ | F03D 13/20 |
| 2022/0195988 A1* | 6/2022 | Klaassen | ................ | F03D 13/10 |

FOREIGN PATENT DOCUMENTS

| | | | |
|---|---|---|---|
| CN | 105339555 A | 2/2016 |
| DE | 202018100604 U1 | 3/2018 |
| EP | S54125821 A | 9/1979 |
| EP | 3868981 A1 | 8/2021 |
| EP | 3933146 A1 | 1/2022 |
| EP | 3933147 A1 | 1/2022 |
| NL | 1004960 C1 | 7/1998 |
| WO | 2009132659 A2 | 11/2009 |

* cited by examiner

COUPLING ASSEMBLY AND METHOD OF DRIVING A MONOPILE

CROSS-REFERENCE TO RELATED APPLICATIONS

This application claims priority to EP Application No. 20216807.6, having a filing date of Dec. 23, 2020, the entire contents of which are hereby incorporated by reference.

FIELD OF TECHNOLOGY

The following relates to a coupling assembly for connecting a tower or a transition piece of a wind turbine to a monopile. The following further relates to a tower end of a tower of a wind turbine connected to said coupling assembly. Finally, the following also relates to a method of driving a monopile of a wind turbine into the ground.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor and rotates the shaft, thereby driving the generator to generate electricity.

The tower of a wind turbine typically comprises multiple tower sections to facilitate the transport of the tower from the production site to the installation site. These sections are usually coupled together by flanges fastened with fasteners. The strength of a flange connection depends on various parameters, for example on the choice of the steel, the wall thicknesses, the bolt diameters, the number of bolts in the bolt circle, the load-path etc. Flanges with a T-shape, so called T-flanges, have proven to be resistant to higher loads as other flanges, such as L-flanges, i.e. flanges with an L-shape. The use of T-flanges and L-flanges to connect tower sections of a wind turbine is known from US 2013/0180199 A1.

Thus, to increase the strength of a flange connection between tower sections, one approach may be to use a T-flange, which has the shape of an inverted "T" with an inner flange extending into the tower interior and an outer flange extending outward from the tower. A T-flange may have around twice the strength of an L-flange, i.e. it can withstand loads around twice as great as the loads that could be withstood by a comparable L-flange. However, a major disadvantage of the T-flange is that it requires access from the outside of the tower as well as access from the tower interior. Although T-flanges account of a greater load-bearing capacity than L-flanges, the assembly and lifetime servicing of wind turbines with towers using T-flanges result in a significant extra cost. The downside of a T-flange is however that it has bolts on the outside of the tower shell, thus it is highly exposed to the corrosive environment of offshore wind farms. The accessing of the T-flanges for maintenance purposes is also difficult.

Additionally, current developments of wind turbines tend to higher towers, as well as towers with smaller diameters and longer rotor blades, which result in loads in the tower higher than the ones which can be supported by L-flanges. Due to the increasing height and weight of the new-generation wind turbines, the L-flanges might not be suited to support the load of some new-generation wind turbines. The use of T-flanges is also not optimal due to the drawbacks of this type of flanges.

A further flange type being able to support higher loads than L-flanges are X-flanges. Hence, X-flanges are suited to support the load of new-generation wind turbines. A first concept of an X-flange connection is described in NL 1004960 C1. The idea of an X-flange is to have inclined studs which cross at a point aligned with the mid-plane of the circumference of the tower shell. This feature gives the flange extreme strength while maintaining accessibility to the studs on the inside of the tower.

XL-flanges are also flanges being able to support the load of new-generation wind turbines, their shape resulting from a combination of X-flanges and L-flanges, i.e. a flange with an L-circle of apertures at its inner radius and a region of X-shaped apertures. Thus, the XL-flange is a special variant of the X-flange, where the L-part is used between other purposes as an interface for attachment of equipment. An XL-flange is easier to handle and to transport than an X-flange due to the L-part of the flange.

An important criterion for establishing competitive offshore wind farms is the reduction of the installation costs of offshore wind turbines. Offshore wind turbine towers are installed on a foundation to anchor the offshore wind turbines to the seabed. Typically, the foundation comprises a monopile, which is advantageous as the same heavy lift equipment of the vessels can be used for both the driving of the large monopile into the ground and the installation of the wind turbine tower on the monopile. The vessels are usually rented, so minimizing the usage time of the vessels can greatly reduce the overall costs of production and installation of offshore wind turbines.

A method of driving the monopile to the required penetration depth at the turbine's offshore location is to use of a driving unit such as a hammer, typically a hydraulic hammer. The bottom section of the monopile needs to be driven deeply into the soil to be able to withstand overturning moments during the lifetime of the wind turbine. For this, an anvil connected to the hammer is positioned over a top end of the monopile. The base of the anvil distributes the impact of a hammer blow uniformly to the monopile's top surface. In the present description, a "blow" is defined as the transfer of load from the hammer to the anvil. During a blow, the hammer may be lifted by the pressure of a hydraulic fluid supplied to the hammer by a power unit. When the fluid is removed, the hammer descends and produces a downward stroke on the anvil.

In certain offshore installations, the monopile is provided with a transition piece to connect the tower to the monopile. The transition piece can be connected to the monopile by a grouted connection. In a grouted connection, the grout is injected into a grouting chamber defined when the transition piece is lowered on the monopile and the walls of the transition piece and the monopile overlap, the monopile being previously driven into the seabed. It may take a couple of weeks until the grout hardens, thus making the grouting process very expensive. This hardening is also strongly dependent on weather conditions, which can lead to long delays in the installation process. Hence, a grouting connection is very costly due to the increased operation time of the vessels used for offshore wind turbine installation. Additionally, the material costs increase due to the large overlapping of steel sections and the needed grout material.

The use of flanges to connect the tower sections can be extended to the connection of the monopile with other functional parts. For example, flanges can be used to connect the tower to the monopile or the transition piece to the monopile. This is very advantageous, as the grouting connection is not needed, which saves costs.

The use of L-flanges connected to the monopile to drive the monopile into the ground is known. For this, the first L-flange is connected to the monopile and the second L-flange is connected to the tower. The first L-flange is coupled to the top surface of the monopile and has a flanged portion extending radially inwards at the top of the flange, this flanged portion having holes for fastening the first L-flange to the second L-flange. A radial extension is to be understood as an extension in a radial direction of the axis of the wind turbine. To protect the insertion holes of the L-flange from the impacts of the driving unit, the contact region where the driving unit impacts the flange is flat and the insertion holes are placed at a tapered region at the inner radial extension of the flange. This ensures a well-defined contact area and thus the transfer of force is concentrated within a controlled region.

A contact region where the anvil of the driving unit impacts is defined at the flange connected to the monopile to ensure that the structure is not damaged while driving the monopile into the soil. This is achieved by hitting the part of the flange surface which is aligned with the tower shell and the monopile shell, i.e. the outer radius of the flange. Thus, the flanged portion extending radially inwards where the insertion holes to connect the flange to the complementary flange are found is not affected by the impacts of the driving unit and no damage of the insertion holes occurs. When the driving unit hits the contact region, the force is transferred perpendicularly from the driving unit over the flange part aligned with the monopile shell to the monopile.

For newly developed heavier offshore wind turbines, L-flanged connections are not able to support the high loads of the turbine due to the above-mentioned reasons. A solution for this problem is the use of flanges which are able to support higher loads, such as X-flanges and XL-flanges. However, the X-flanges and XL-flanges known from the prior art have the apertures of the insertion holes in the region aligned with the tower shell and the monopile shell, i.e. the region where the driving unit impacts against the flange, which results in a damage of the insertion holes if they are hit by the driving unit. Thus, the use of X-flanges and XL-flanges to drive the monopile into the ground is not possible without further modification of these flanges, as the method of hammering L-flanges known from the prior art is not suited for hammering X-flanges and XL-flanges without previously modifying this type of flanges to make them suitable to be hammered on. Hammering this region would damage the apertures and impede the studs or other fasteners from being inserted in the insertion holes and correctly fastened.

SUMMARY

An aspect relates to provide an improved flange resistant to driving unit impacts which is also able to support the high loads of the new generation of wind turbines.

A coupling assembly for connecting a tower or a transition piece of a wind turbine to a monopile according to embodiments of the invention comprises a first coupling part configured to be connected to the monopile and a second coupling part configured to be connected to the first coupling part. The first coupling part comprises a first annular connection face and an inclined first insertion hole being configured to be inserted by a fastener. The second coupling part has a second annular connection face configured to abut the first annular connection face of the first coupling part. The second coupling part further comprises an inclined second insertion hole being configured to be inserted by the fastener.

The first coupling part can be configured as a flange suitable to be connected to a complementary flange, which is the second coupling part. The flange of the first coupling part has a first annular connection face that will lie against a second annular connection face of the complementary flange.

According to embodiments of the invention, the first annular connection face comprises a contact region and a load transfer region. The contact region is the region of the first annular connection face where a driving unit hits against the first coupling part to drive the monopile into the ground during the installation of the monopile. The load transfer region is the region of the first annular connection face where loads are transferred from the second coupling part to the first coupling part. The contact region is a different region of the first annular connection face from the load transfer region.

The advantage of having a contact region which is different from the load transfer region is that the driving unit has a well-defined region where it hits the flange to drive the monopile into the ground.

An impact of the driving unit on any of the first insertion hole openings is to be avoided, as the first insertion hole openings can be damaged by the driving unit, complicating the fastening of the first coupling part to the second coupling part. Advantageously, the contact region is at a distance from any of the insertion hole openings.

According to a preferred embodiment of the invention, the first insertion hole of the first coupling part is at the load transfer region of the first annular connection face. This is advantageous, as the driving unit only impacts against the contact region, which is a region different from the load transfer region. Hence, the first insertion holes are not damaged by the driving unit.

According to another preferred embodiment of the invention, the first annular connection face has a primary circle comprising an annular arrangement of inclined openings of first insertion holes forming an insertion hole circle and a secondary circle comprising an annular arrangement of inclined openings of first insertion holes forming another insertion hole circle, the primary circle and the secondary circle being at a different radius from the axis of the wind turbine. Advantageously, the first insertion holes of the primary circle and the first insertion holes of the secondary circle are distributed alternately to form the X-apertures characteristic of X-flanges and XL-flanges.

The inclined openings of the first coupling part extend from the first annular connection face into the body of the first coupling part. Similarly, the inclined openings of the second coupling part extend from the second annular connection face into the body of the second coupling part. An advantage of inclined insertion holes is that the joint is effectively done within the main part of the coupling assembly. This means that loads are much more effectively transferred with the coupling assembly. In contrast, the connection of conventional L-flanges is at the inner radial extension of the flange, which is distanced from the main part of the flange aligned with the tower shell or the monopile shell, so that the load path is at an offset, resulting in greater bending moments.

According to a preferred embodiment, the first insertion holes of the primary circle and of the secondary circle are an alternation of a blind hole and a through-hole. A blind hole terminates in the body of the first coupling part. A through-hole extends all the way through the body of the first coupling part. In other words, every second opening in the primary circle and in the secondary circle is an inclined through-hole and the other openings are inclined blind holes.

Similarly, the second insertion holes of the second coupling part corresponding to the first insertion holes of the first coupling part are also an alternation of a blind hole and a through-hole, so that a fastener is introduced through a through-hole of the first coupling part and a blind hole of the second coupling part and vice versa. In other words, a blind hole of the first coupling part is aligned with a through-hole of the second coupling part and a through-hole of the first coupling part is aligned with a blind hole of the second coupling part. This allows to form the X-apertures characteristic of X-flanges and XL-flanges.

According to a preferred embodiment of the invention, the first annular connection face has at least two load transfer regions, the contact region being positioned radially between both load transfer regions. Under radially it is meant a radial direction from the axis of the wind turbine or from the axis of the monopile, which is the same axis. This is advantageous, as bending moments resulting by having a single load transfer region can be avoided, as both load transfer regions distribute the load transfer over the surface of the first annular connection face. As one load transfer region is in the outer radial region and the other one is in the inner radial region of the first annular connection face, the load can be optimally distributed from the second coupling part to the first coupling part.

According to a preferred embodiment of the invention, the primary circle of first insertion holes is at the outer radial load transfer region and the secondary circle of first insertion holes is at the inner radial load transfer region. This allows to both optimally distribute the load and to protect the first insertion holes from the driving unit.

According to another preferred embodiment of the invention, the first coupling part and/or second coupling part is formed of a plurality of pieces.

The division of the coupling assembly into different pieces or into pieces with differing heights has the advantage that the connection surface of the first coupling part to the second coupling part can be chosen to have a defined contact region away from the first insertion hole openings of the first coupling part. In contrast, if the coupling assemblies were to have a one-piece first coupling part and a one-piece second coupling part with the same height, the division of the two coupling parts would be in the middle of the coupling assembly and the contact region would fall exactly on the openings of the first insertion holes due to the X-arrangement of the insertion holes, which should be avoided in order not to damage the first insertion holes while driving the monopile into the ground.

According to another preferred embodiment of the invention, the contact region is aligned with the connection region where the first coupling part is connected to the monopile. Hence, the driving unit impacts the region aligned with the monopile shell and the load is transferred perpendicularly to drive the monopile into the ground. This avoids having bending moments at the flange and at the monopile while driving the monopile into the ground. Additionally, the impulse force of the driving unit can be transferred directly and perpendicularly to the fillet of the flange neck and to the monopile, avoiding vibrations and tilting which might lead to a damage of the first coupling part.

According to another preferred embodiment of the invention, the contact region is not configured to support the load of the wind turbine. The contact region is also not configured to support the preload of the fasteners of the coupling assembly. For this, the load transfer region can be configured to support the load of the wind turbine and/or to support the preload of the fasteners of the coupling assembly.

The hitting of the driving unit on the contact region results in an abrupt uneven surface and in deformations of the contact region after the driving of the monopile. As it cannot be foreseen how the contact region will look like after the driving, a complementary surface of the second coupling part will not be able to optimally abut the contact region, thus resulting in a poorer load transfer after driving the monopile. Thus, a specific region configured for driving unit contact and a different specific region configured for load transfer of the wind turbine can solve this problem.

According to a preferred embodiment of the invention, the first annular connection face has an elevation at the contact region configured to be hit against by the driving unit. This allows for a well-defined contact region where the driving unit sits and hits against the first coupling part to drive the monopile. Additionally, the main body of the first coupling part is not affected by the hitting of the driving unit, as the deformations of the contact surface occur at the elevation. Hence, the main body of the first coupling part is protected from the impacts of the driving unit.

According to another preferred embodiment of the invention, the first annular connection face has an inclined surface to protect the first insertion hole from being damaged by the driving unit. For this, the driving unit hits the flat surface of the first annular connection face at the corner between the inclined surface and the flat surface and the first insertion hole is not affected by the deformations. Additionally, the inclined surface enables for the contact zone to be defined at the flat surface of the first annular connection face aligned with the monopile shell and with the fillet of the flange neck of the first coupling part, so that the hits of driving unit on the flat surface of the first annular connection face are transferred perpendicularly through the body of the first coupling part over the fillet of the flange neck to the monopile. This leads to a well-defined straight load path. The inclination angle should suffice so that the inclined surface is not in contact with the driving unit during the driving of the monopile.

The use of an elevation or an inclined surface is also advantageous for a more efficient energy transfer of the driving unit impacts and less risk of damaging the flange of the first coupling part. Without these features, the impulse force of the driving unit can cause excessive vibrations and tilting which might lead to a damage of the first coupling part, especially around the fillet of the flange neck.

According to another preferred embodiment of the invention, the inclined surface is positioned radially inwards from the contact region. This is particularly advantageous if the first coupling part has a primary circle of inclined openings of first insertion holes at the flat region of the first annular connection face and a secondary circle of inclined openings of first insertion holes at the inclined region of the first annular connection face. If the anvil of the driving unit has an outer diameter smaller than the diameter of the primary circle, then the primary circle is not affected by the impacts of the driving unit. Additionally, the secondary circle is protected as well against impacts as it is set at the inclined surface of the first annular connection face.

According to another preferred embodiment of the invention, the inclined surface is a load transfer region configured to support the load of the wind turbine and/or to support the preload of the fasteners of the coupling assembly. Additionally, if both the inclined surface and the part of the flat surface not being the contact region are both load transfer regions, bending moments can be avoided, as both load transfer regions distribute the load transfer over the surface of the first annular connection face, and the load can be optimally distributed from the second coupling part to the first coupling part.

The region of the inclined surface in proximity to the corner between the inclined surface and the flat surface of the first annular connection face might also be partly damaged by the hits of the driving unit on the flat surface at the corner. Therefore, the region of the inclined surface in proximity to the corner might not be suited as a load transfer region configured to support the load of the wind turbine and/or to support the preload of the fasteners of the coupling assembly. However, the rest of the inclined surface and particularly the part of the inclined surface containing the first insertion holes not being in proximity to the corner between the inclined surface and the flat surface of the first annular connection face can be a load transfer region configured to support the load of the wind turbine and/or to support the preload of the fasteners of the coupling assembly.

According to another preferred embodiment of the invention, the second coupling part further comprises a recess aligned with the contact region. The recess allows to couple the first coupling part with the second coupling part without having to press the elevation of the first coupling part against the second coupling part.

According to another preferred embodiment of the invention, there is a gap between the first coupling part and the second coupling part at the contact region. Advantageously, there is a gap between the elevation of the first coupling part and the recess of the second coupling part when both parts are coupled together. The hitting of the driving unit on the contact region results in an uneven surface and in deformations such as abrupt corners or peaks of the contact region or of the elevation on the contact region. Due to this abrupt uneven surface of the contact region after the driving of the monopile, the contact region is not suited afterwards to support the load of the wind turbine and/or to support the preload of the fasteners of the coupling assembly. By having a tolerance wide enough to form a gap between the elevation of the first coupling part and the recess of the second coupling part, contact between the contact region and the second annular connection face can be avoided, thus avoiding a damage of the second annular connection face caused by pressing this surface against the deformations of the contact region.

The gap between both components is not an essential feature, there might be contact between the contact region and the second annular connection face. However, the contact region is not suited to support and transfer the loads of the wind turbine. For transferring the loads, the first annular connection face has a different region from the contact region, which is the load transfer region.

According to another preferred embodiment of the invention, the second coupling part further comprises a chamber configured to protect the second insertion hole. The chamber can be drilled in some parts of the region where the fastener is fastened at the second coupling part to protect the second insertion holes. The advantage of using is that there is sufficient space between the contact region and the second coupling part to avoid any damage of the second coupling part. Additionally, the fasteners can be inserted and fastened more easily.

According to another preferred embodiment of the invention, a transition piece is connected to a second coupling part of the coupling assembly, said second coupling part having a second annular connection face configured to abut a first annular connection face of a first coupling part of the coupling assembly and further comprising an inclined second insertion hole being configured to be inserted by a fastener.

According to another preferred embodiment of the invention, a tower end of a tower is connected to a transition piece. Said transition piece is connected to a second coupling part of the coupling assembly, said second coupling part having a second annular connection face configured to abut a first annular connection face of a first coupling part of the coupling assembly and further comprising an inclined second insertion hole being configured to be inserted by a fastener.

Yet another aspect of embodiments of the present invention relates to a tower end of a tower of a wind turbine connected to a second coupling part of the coupling assembly, said second coupling part having a second annular connection face configured to abut a first annular connection face of a first coupling part of the coupling assembly and further comprising an inclined second insertion hole being configured to be inserted by a fastener.

Another aspect of embodiments of the invention relates to a method of driving a monopile of a wind turbine into the ground, a top end of the monopile being connected to a first coupling part of the coupling assembly comprising the steps of positioning the driving unit on the contact region of the first coupling part and hitting the driving unit against the contact region of the first coupling part to drive the monopile into the ground.

BRIEF DESCRIPTION

Some of the embodiments will be described in detail, with reference to the following figures, wherein like designations denote like members, wherein.

DETAILED DESCRIPTION

Figure 1:
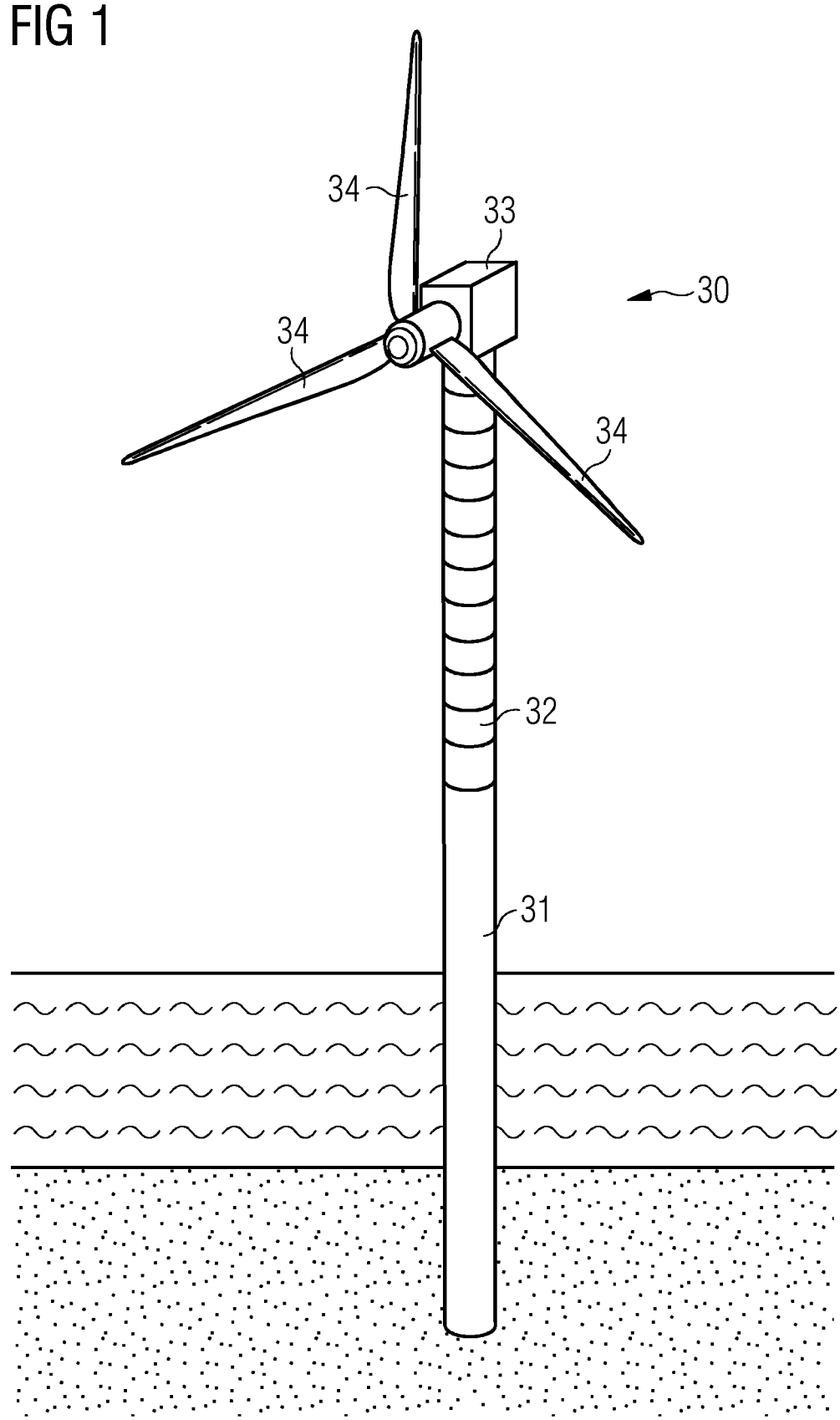
FIG. 1 shows a perspective view of an offshore wind turbine.

FIG. 1 shows a perspective view of a wind turbine 30 installed in an offshore wind farm. The wind turbine 15 comprises a hub connected to a generator (not shown) arranged inside a nacelle 33. The hub comprises three wind turbine blades 34. The nacelle 33 is arranged at an upper end of a tower 32 of the wind turbine 30. The tower 32 comprises multiple tower sections. The tower 32 is mounted directly on the foundation, in this case a monopile 31.

Figure 2:
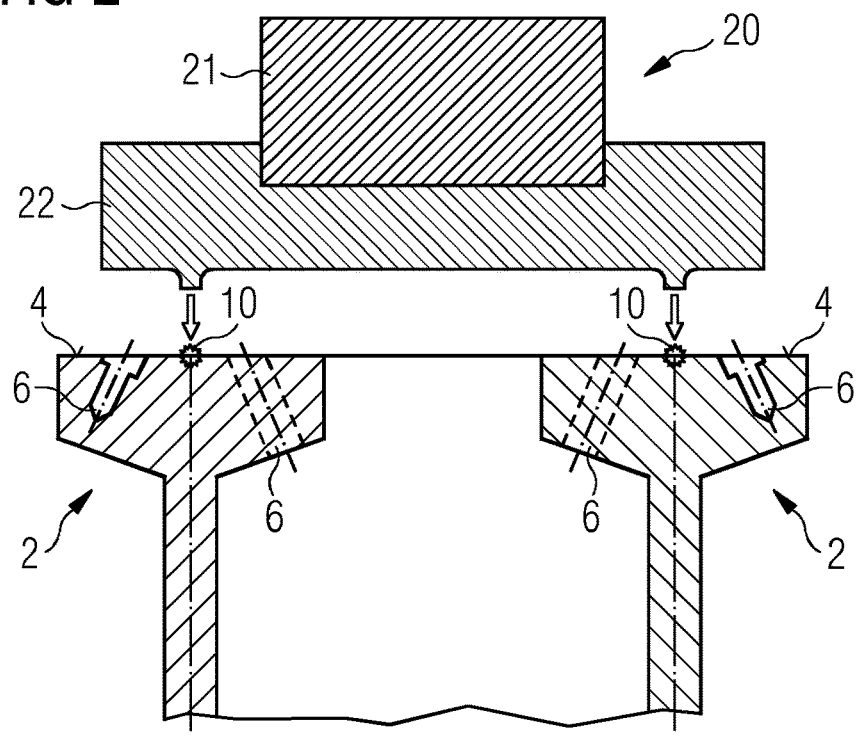
FIG. 2 shows the driving of a monopile into the ground using a driving unit and a first coupling part according to an embodiment of the invention.
Figure 3:
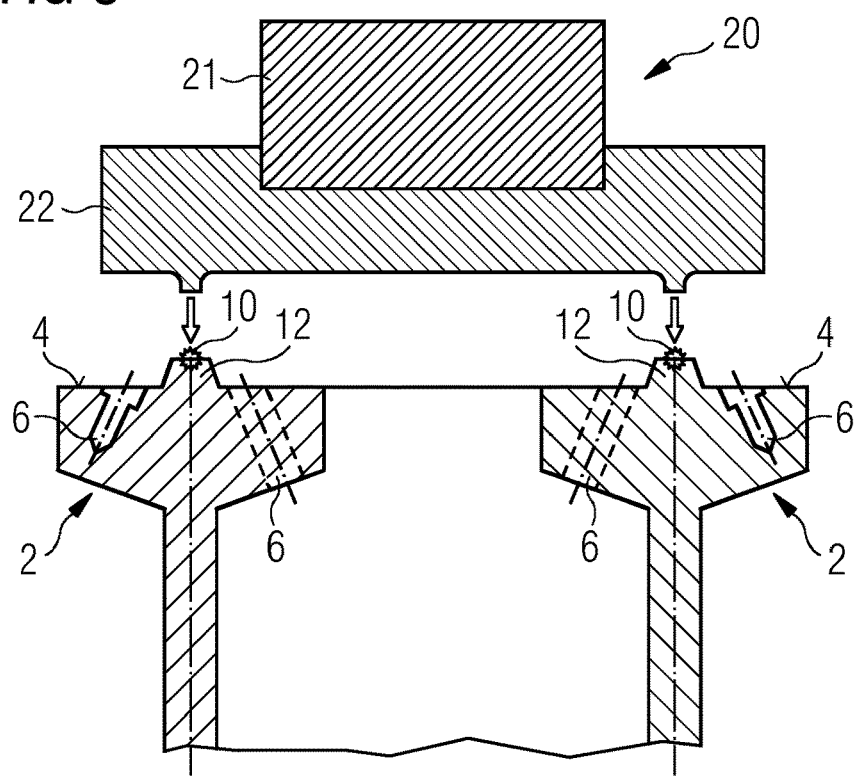
FIG. 3 shows the driving of a monopile into the ground using a driving unit and a first coupling part according to an embodiment of the invention.

FIGS. 2 and 3 show a cross-sectional view of a first coupling part 2 of a coupling assembly 1 attached to a monopile 31 (not shown) being driven into the ground by a driving unit during the installation of the wind turbine 30 in an offshore wind farm.

The driving unit 20 comprises a hammer 21 and an anvil 22. The first coupling part 2 has a contact region 10 where the anvil 22 contacts said first coupling part 2 and transfers the force from the driving unit 20 through the first coupling part 2 to the monopile 31 to drive the monopile 31 into the ground. For this, the anvil 22 is positioned over the monopile 31 on the top surface of the first coupling part 2 forming a first annular connection face 4, which is used later for the coupling of the second coupling part 3 to the first coupling part 2 of the coupling assembly 1. The base of the anvil 22 distributes the impact of the hammer 21 blow uniformly on the contact region 10 of the first annular connection face 4.

An impact of the anvil 22 on any of the first insertion hole 6 openings is to be avoided, as the first insertion hole 6 openings can be damaged by the driving unit 20, complicating the fastening of the first coupling part 2 to a second coupling part 3 by means of fasteners 9. To achieve this, the contact region 10 is at a distance wide enough from any of the first insertion hole 6 openings. Additionally, the force from the driving unit 20 should be transferred perpendicularly to ensure that the structure is not damaged while driving the monopile 31 into the soil. Hence, the contact region 10 is aligned with the monopile 31 shell and the force is transferred from the contact region 10 over the fillet of the flange neck of the first coupling part 2 directly and perpendicularly to the monopile 31 to drive the monopile 31 into the ground.

A defined contact region 10 away from the first insertion hole 6 openings can be achieved by forming an anvil elevation at the region of the anvil 22 in contact with the contact region 10, as shown in FIG. 2. Hence, the anvil 22 sits on the anvil elevation directly on the contact region 10 and transfers the load of the hammer 21 only at the contact region 10.

Through the anvil elevation, a contact of the anvil 22 with the first insertion holes 6 is avoided.

Alternatively, a defined contact region 10 away from the first insertion hole 6 openings can be achieved by forming an elevation 12 at the first coupling part 2, as shown in FIG. 3. Here, a flat anvil 22 only contacts the first coupling part 2 at the elevation 12 of the first annular connection face 4, thus avoiding a contact of the anvil 22 at the first insertion hole 6 openings.

FIGS. 4 to 8 show a coupling assembly 1 according to different embodiments of the invention. In these figures, the first coupling part 2 is formed of a single piece, whereas the second coupling part 3 is formed of one or a plurality of pieces depending on the embodiment of the invention. A second coupling part 3 formed of a plurality of pieces is advantageous for the manufacturing process, as the single pieces can be more easily produced.

The division of the coupling assembly 1 into different pieces or into pieces with differing heights has the further advantage that the connection surface of the first coupling part 2 to the second coupling part 3 can be chosen to have a defined contact region 10 away from the first insertion hole 6 openings of the first coupling part 2. If the coupling assemblies 1 shown in these figures were to have a one-piece first coupling part 2 and a one-piece second coupling part 3 with the same height, the division of the two coupling parts 2, 3 would be in the middle of the coupling assembly 1 and the contact region 10 would fall exactly on the openings of the first insertion holes 6, which should be avoided in order not to damage the first insertion holes 6 while driving the monopile 31 into the ground.

Thus, by dividing the second coupling part 3 into different pieces or by choosing a different height of the first coupling part 2 and the second coupling part 3, each of the embodiments of the invention shown in FIGS. 4 to 8 have the contact region 10 away from the openings of the first insertion holes 6.

Figure 4:
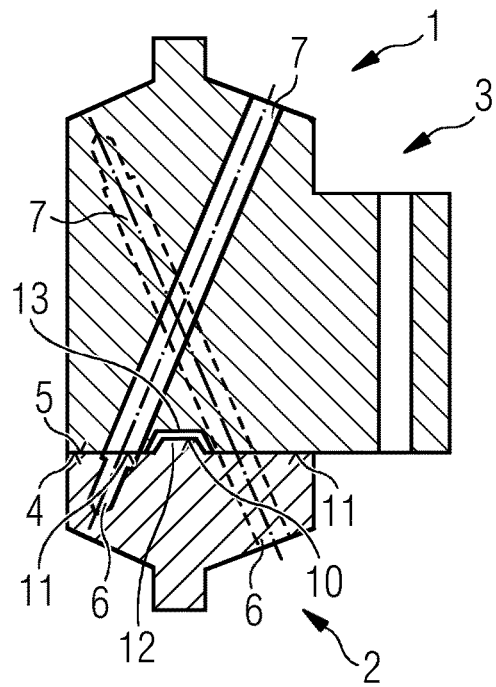
FIG. 4 shows a coupling assembly divided into two unequal pieces which are the first coupling part and the second coupling part according to an embodiment of the invention
Figure 5:
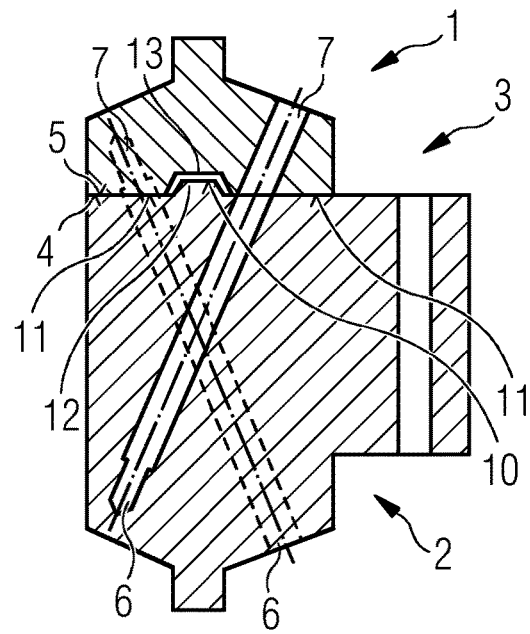
FIG. 5 shows a coupling assembly divided into two unequal pieces which are the first coupling part and the second coupling part according to an embodiment of the invention.

In FIGS. 4 and 5, the coupling assembly 1 is divided into two unequal pieces which are the first coupling part 2 and the second coupling part 3.

Figure 6:
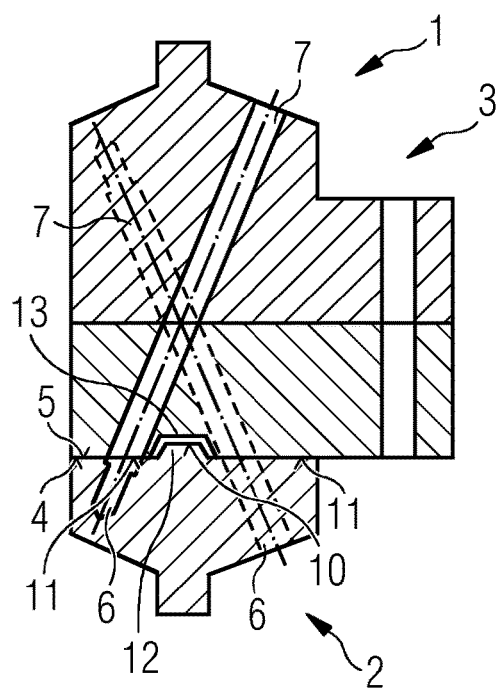
FIG. 6 shows a coupling assembly divided into three unequal pieces, two of them forming the second coupling part and one of them the first coupling part according to an embodiment of the invention.
Figure 7:
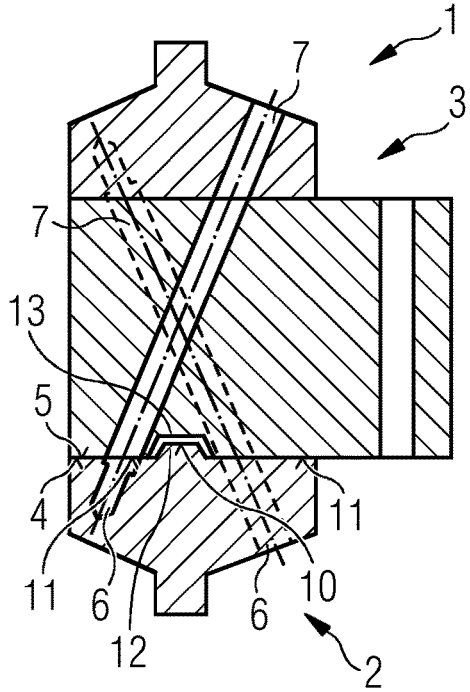
FIG. 7 shows a coupling assembly divided into three unequal pieces, two of them forming the second coupling part and one of them the first coupling part according to an embodiment of the invention.

In FIGS. 6 and 7, the coupling assembly 1 is divided into three unequal pieces, two of them forming the second coupling part 3 and one of them the first coupling part 2. For example, in FIG. 7, the second coupling part 3 is formed of an upper flange piece and a middle ring.

Figure 8:
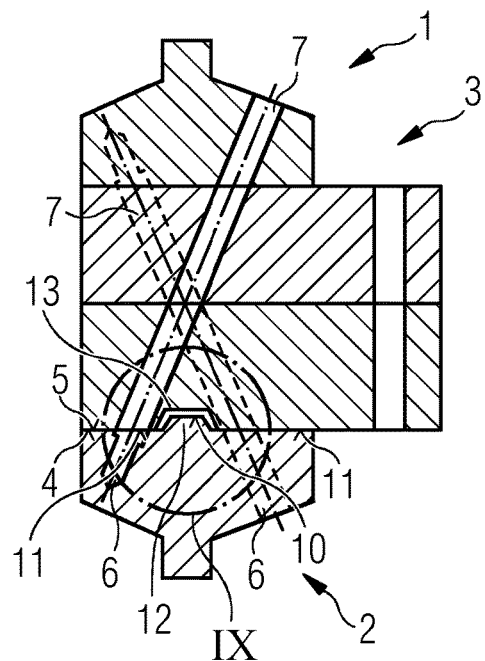
FIG. 8 shows a coupling assembly according to different embodiments of the invention.

In FIG. 8, the coupling assembly 1 is divided into four unequal pieces, three of them forming the second coupling part 3 and one of them the first coupling part 2. The second coupling part 3 is formed of two ring pieces of similar shape and an upper flange piece with a shape similar to the first coupling part 2 but without an elevation 12, as this part is not hit by the driving unit 20. By having similar pieces, the production costs are lower. For example, two equal rings can be produced for the middle ring pieces of the second coupling part 3 and then one of them drilled along the surface to get the recess 13 of the second coupling part 3.

Figure 9:
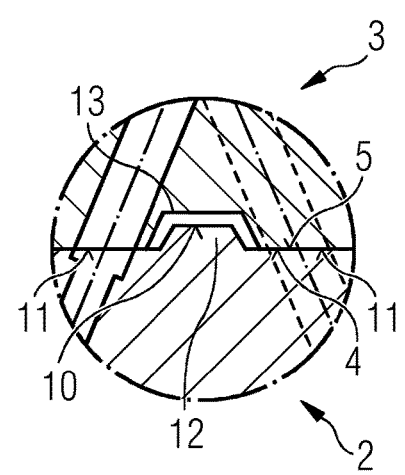
FIG. 9 shows a closer view IX of the contact region of the coupling assembly of FIG. 8.

FIG. 9 shows a closer view of the region IX where the second annular connection face 5 of the second coupling part 3 abuts the first annular connection face 4 of the first coupling part 2, particularly a view of the contact region 10 and its surroundings. As can be seen here, there is a small gap between the elevation 12 of the first coupling part 2 and the recess 13 of the second coupling part 3 at the contact region 10. Having a tolerance between both coupling parts 2, 3 in the contact region 10 is advantageous, as the elevation 12 of the first coupling part 2 will be partly deformed during the driving of the monopile 31 into the ground, as the driving unit 20 hits on the elevation 12 of the first coupling part 2. This hitting on the elevation 12 results in deformations such as abrupt corners or peaks of the contact region 10 on the elevation 12. Due to this abrupt uneven surface of the contact region after the driving of the monopile 31, the contact region 10 is not suited afterwards to support the load of the wind turbine 30 and/or to support the preload of the fasteners 9 of the coupling assembly 1. By having a tolerance wide enough to form a gap between the elevation 12 of the first coupling part 2 and the recess of the second coupling part 3, contact between the contact region 10 and the second annular connection face 5 can be avoided, thus avoiding a damage of the second annular connection face 5 caused by pressing this surface against the deformations of the contact region 10.

The gap between both components is not an essential feature, there might be contact between the contact region 10 and the second annular connection face 5. However, the contact region 10 is not suited to support and transfer the loads of the wind turbine 30. For transferring the loads, the first annular connection face 4 has a different region from the contact region 10, which is the load transfer region 11.

In the cross-sectional view of FIG. 8, the load transfer region 11 is at the sides of the contact region 10, the load transfer region 11 being a different region than the contact region 10. Once the coupling assembly 1 is coupled, the loads of the wind turbine 30 are transferred through the load transfer region 11 of the first annular connection face 4 from the second coupling part 3 to the first coupling part 2.

Figure 10:
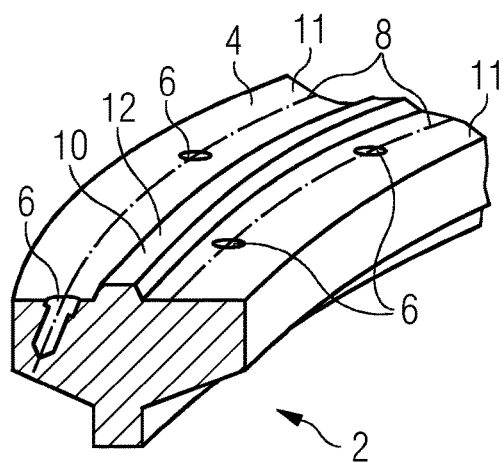
FIG. 10 shows a perspective view of the first coupling part of the coupling assembly of FIG. 8.

FIG. 10 shows a perspective view of the first coupling part 2 of the coupling assembly 1 of FIG. 8. The elevation 12 forming the contact region 10 is a different region from the load transfer region 11. Hence, the driving unit 20 only contacts the elevation 12 at the contact region 10 of the first annular connection face 4 while driving the monopile 31 into the ground. The elevation 12 is distanced from every first insertion hole 6 of each insertion hole circle 8 to avoid a damage of the first insertion holes 6 when the driving unit 20 hits the contact region 10.

Figure 11:
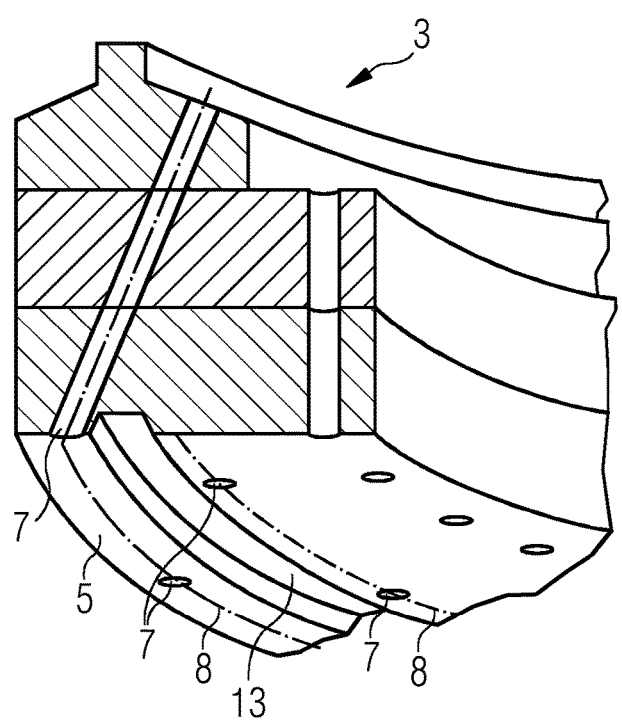
FIG. 11 shows a perspective view of the second coupling part of the coupling assembly of FIG. 8.

FIG. 11 shows a perspective view of the second coupling part 3 of the coupling assembly 1 of FIG. 8. The second annular connection face 5 of the second coupling part 3 is configured to abut the first annular connection face 4 of the first coupling part 2 at the load transfer region 11 of the first annular connection face 4. The second insertion holes 7 of the second coupling part 3 correspond to the first insertion holes 6 of the first coupling part 2.

As can be seen in the figures, the first insertion holes 6 and the second insertion holes 7 are inclined insertion holes 6, 7, i.e. insertion holes 6, 7 with inclined openings. The inclined openings extend from the annular connection faces 4, 5 into the body of the coupling parts 2, 3.

The holes and openings at the L-part of the coupling assembly 1 are used for the connection to an interim structure and not used for fastening the second coupling part 3 to the first coupling part 2. An interim structure is an apparatus such as a holding structure used during transportation of the coupling parts 2, 3 or a lifting interface used during installation, which does not necessarily need to be an element of the tower 32 or of the coupling assembly 1.

Figure 12:
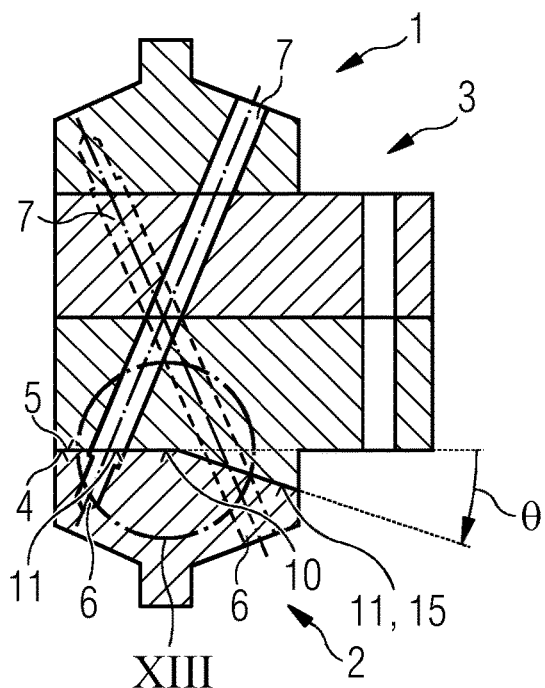
FIG. 12 shows a coupling assembly according to another embodiment of the invention.
Figure 13:
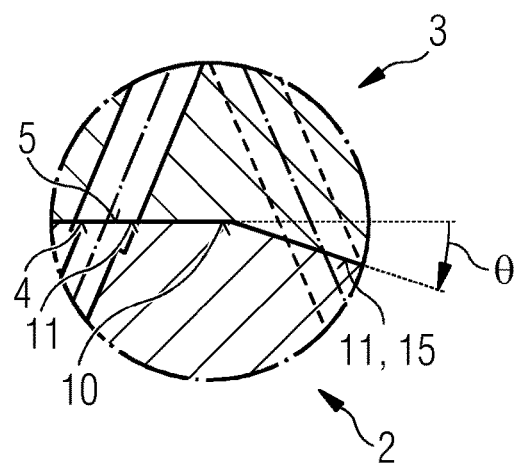
FIG. 13 shows a closer view XIII of the contact region of the coupling assembly of FIG. 12.

FIGS. 12 and 13 show a coupling assembly 1 according to another embodiment of the invention. In this case, there is no gap between the contact region 10 of the first coupling part 2 and the second annular connection face 5 of the second coupling part 3. FIG. 13 shows in particular a closer view of the region XIII of FIG. 12.

Figure 14:
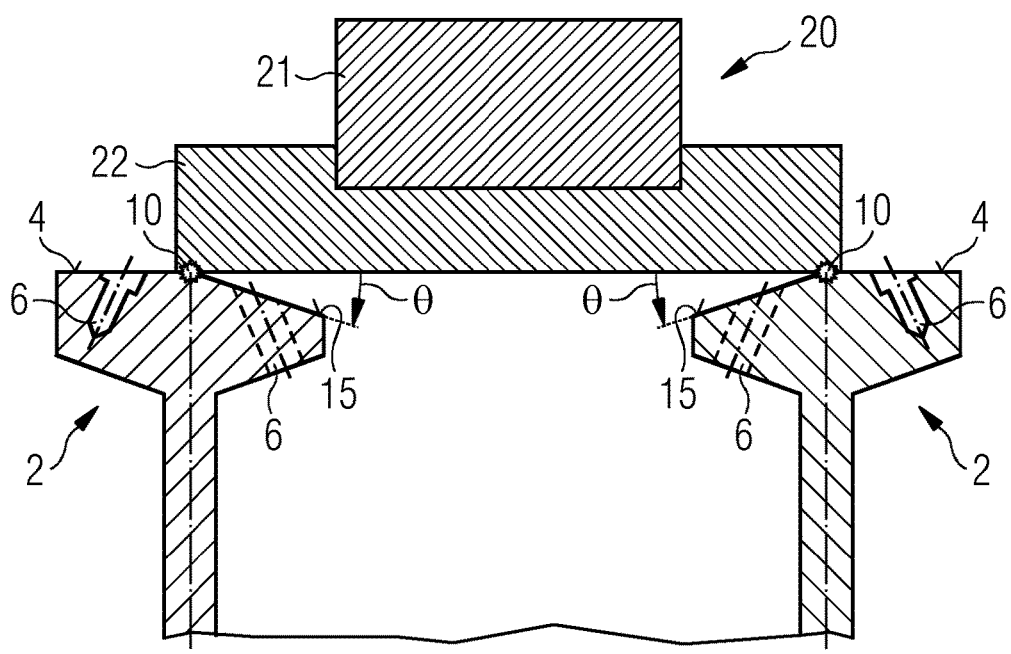
FIG. 14 shows the driving of a monopile into the ground using a driving unit and a first coupling part according to another embodiment of the invention.

To avoid a damage of the first insertion holes 6, the first annular connection face 4 has an inclined surface 15 at the region radially inwards from the contact region 10. The inclination angle θ should suffice so that the inclined surface 15 is not in contact with the driving unit 20 during the driving of the monopile 31, as shown in FIG. 14. The anvil 22 has an outer diameter smaller than the diameter of the outer first insertion holes 6. Hence, the outer first insertion holes 6 of the first coupling part 2 are protected against the hitting of the driving unit 20. The inner first insertion holes 6 of the first coupling part 2 are protected as well, as they are at the inclined surface 15 which is not contacted by the driving unit 20.

The load of the wind turbine 30 is transferred by the load transfer region 11 at the outer part of the first annular connection face 4, i.e. the part radially outwards from the contact region 10, and by the load transfer region 11 at the inner part of the first annular connection face 4 at the inclined surface 15. For this, the second coupling part 3 has also an inclined surface 15 matching the inclined surface 15 of the first coupling part.

Figure 15:
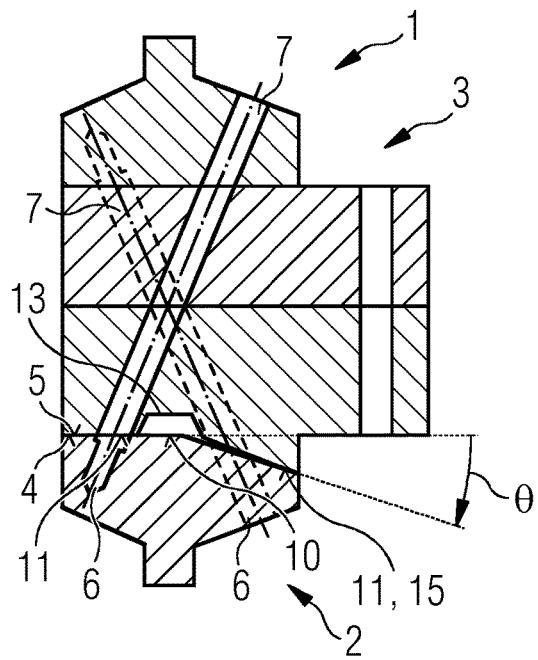
FIG. 15 shows a coupling assembly according to an embodiment of the invention.
Figure 16:
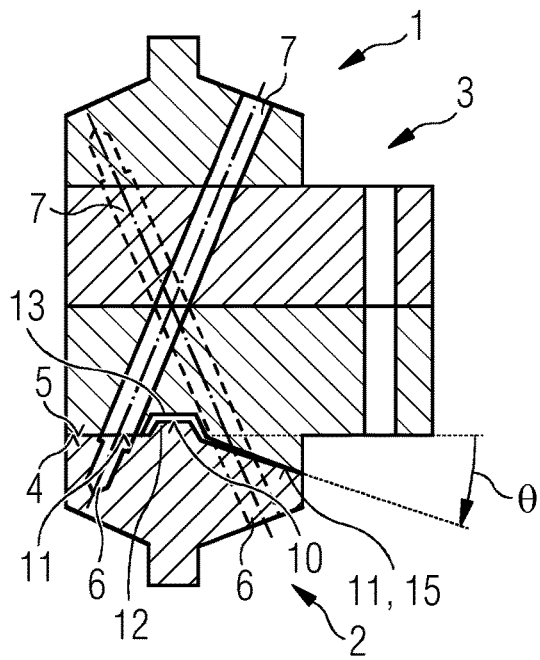
FIG. 16 shows a coupling assembly according to an embodiment of the invention.
Figure 17:
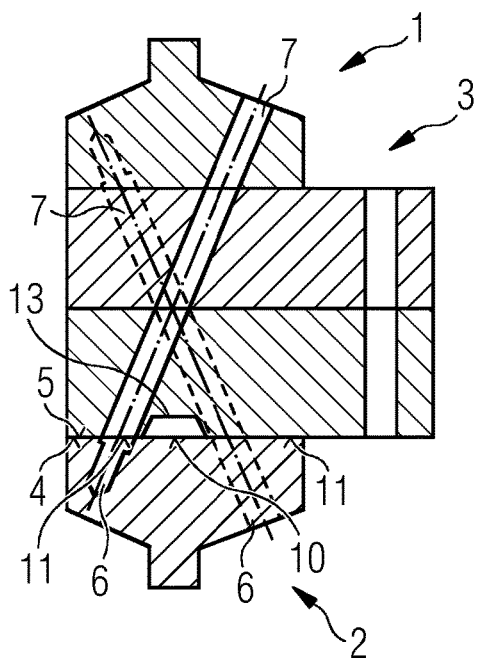
FIG. 17 shows a coupling assembly according to an embodiment of the invention.
Figure 18:
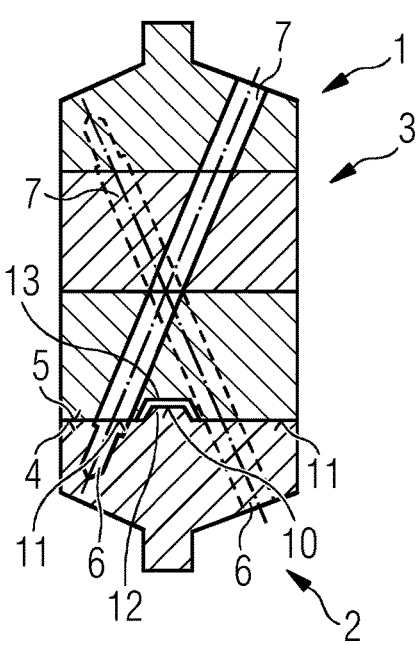
FIG. 18 shows a coupling assembly according to further different embodiments of the invention.
Figure 19:
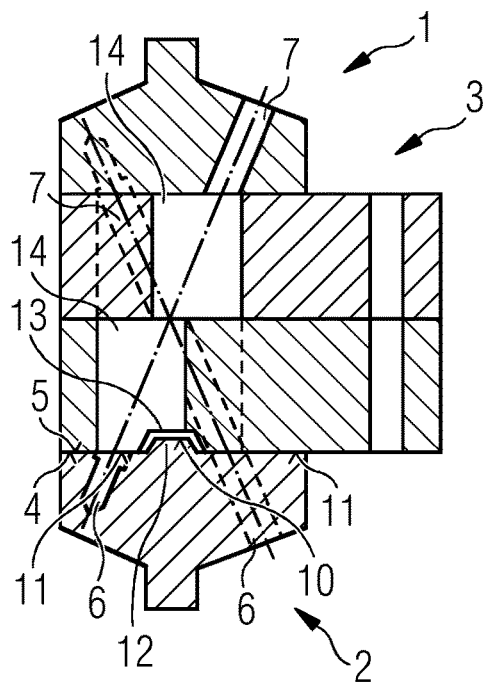
FIG. 19 shows a coupling assembly divided into four unequal pieces, three of them forming the second coupling part and one of them the first coupling part according to an embodiment of the invention.
Figure 20:
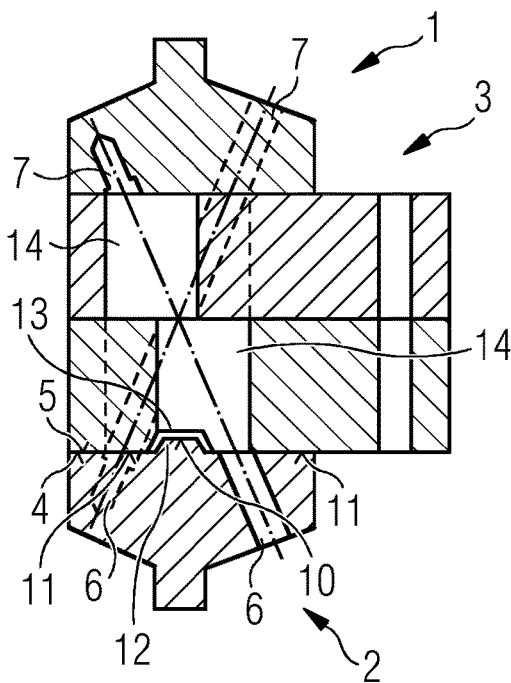
FIG. 20 shows a coupling assembly divided into four unequal pieces, three of them forming the second coupling part and one of them the first coupling part according to an embodiment of the invention.
Figure 21:
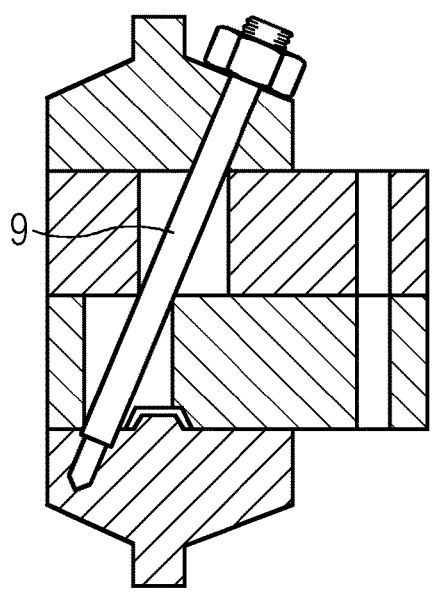
FIG. 21 shows a coupling assembly divided into four unequal pieces, three of them forming the second coupling part and one of them the first coupling part according to an embodiment of the invention.
Figure 22:
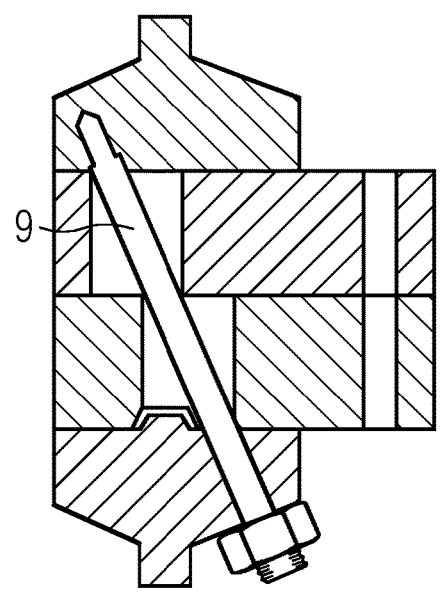
FIG. 22 shows a coupling assembly according to another embodiment of the invention.
Figure 23:
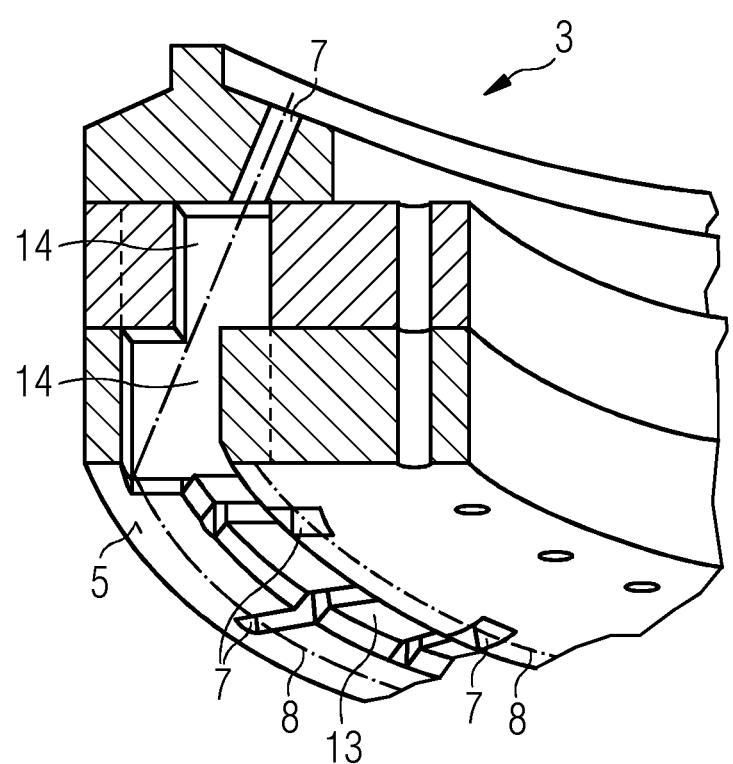
FIG. 23 shows a perspective view of the second coupling part of the coupling assembly of FIGS. 19 to 22.

FIGS. 15 to 18 show a coupling assembly 1 according to further different embodiments of the invention. In FIG. 15, a recess 13 is added to the embodiment of FIG. 12 to avoid deformations of the contact region 10 caused by the driving unit 20 to damage the second annular connection face 5 of the second coupling part 3. In FIG. 16, an elevation 12 is added to the first coupling part 2 shown in the embodiment of FIG. 15 to have a well-defined contact region 10 where the driving unit 20 hits the first coupling part 2. In FIG. 17, the first coupling part 2 has no elevation 12, thus a flat surface of the first annular connection face 4 and the second coupling part 3 has a recess 13. FIG. 18 shows an X-flange with a contact region 10 similar than the one of the XL-flange of FIG. 8. The only difference between FIG. 8 and FIG. 18 is that FIG. 18 does not have the L-portion of the XL-flange of FIG. 8, which is used as an interface for attachment of equipment.

FIGS. 19 to 23 show a coupling assembly 1 according to a further embodiment of the invention. In these figures, the coupling assembly 1 is divided into four unequal pieces, three of them forming the second coupling part 3 and one of them the first coupling part 2. The second coupling part 3 is formed of two ring pieces of similar shape and an upper flange piece with a shape similar to the first coupling part 2 but without an elevation 12, as this part is not hit by the driving unit 20.

Hence, the first coupling part 2 has an elevation 12 at the contact region 10 as seen in other embodiments of the invention. Similarly, the second coupling part 3 has a recess 13. Additionally, each ring of the second coupling part 3 has a chamber 14 in the region where the fastener 9 passes through the coupling assembly 1. These chambers 14 can be drilled in a rectangular shape, as shown in the figures, or in an oval shape, depending on the size of the drill.

The advantage of using chambers 14 in addition to the recess 13 is that there is sufficient space between the contact region 10 and the second coupling part 3 to avoid any damage of the second coupling part 3. Additionally, the fasteners 9 can be inserted and fastened more easily.

The use of a chamber 14 can also be extended to an embodiment with an inclined surface 15.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 Coupling assembly
2 First coupling part
3 Second coupling part
4 First annular connection face
5 Second annular connection face
6 First insertion hole
7 Second insertion hole
8 Insertion hole circle
9 Fastener
10 Contact region
11 Load transfer region
12 Elevation
13 Recess
14 Chamber
15 Inclined surface
20 Driving unit
21 Hammer
22 Anvil
30 Wind turbine
31 Monopile
32 Tower
33 Nacelle
34 Blade
θ Inclination angle

The invention claimed is:

1. A coupling assembly for connecting a tower or a transition piece of a wind turbine to a monopile comprising:
a first coupling part configured to be connected to the monopile, the first coupling part having a first annular connection face and an inclined first insertion hole being configured to be inserted by a fastener, wherein the first annular connection face has a primary circle comprising an annular arrangement of inclined openings of inclined first insertion holes forming an insertion hole circle, and a secondary circle comprising an annular arrangement of inclined openings of first insertion holes forming another insertion hole circle, the primary circle and the secondary circle being at a different radius from an axis of the wind turbine; and
a second coupling part configured to be connected to the first coupling part, the second coupling part having a second annular connection face configured to abut the first annular connection face of the first coupling part, wherein the second coupling part further comprises an inclined second insertion hole being configured to be inserted by the fastener,
wherein the first annular connection face comprises a contact region and a load transfer region, the contact region being a region of the first annular connection face between the primary circle and the secondary circle and aligned with a shell of the monopile where a driving unit hits against the first coupling part to drive the monopile into the ground during an installation of the monopile, the load transfer region being a region of the first annular connection face where loads are transferred from the second coupling part to the first coupling part;
wherein the contact region is a different region of the first annular connection face from the load transfer region;
wherein:
the first coupling part and the second coupling part are separate, unequal pieces such that the first coupling part has a height, measured as a distance from a bottom surface of the first coupling part to a top surface of the first coupling part, that is different than a height of the second coupling part, measured as a distance from a bottom surface of the second coupling part to a top surface of the second coupling part, and the inclined first insertion hole extends a length within the first coupling part from the first annular connection face that is different than a length that the inclined second insertion hole extends into the second coupling part from the second annular connection face.

2. The coupling assembly according to claim 1, wherein the first annular connection face has at least two load transfer regions, the contact region being positioned radially between both load transfer regions.

3. The coupling assembly according to claim 1, wherein the contact region is aligned with a connection region where the first coupling part is connected to the monopile.

4. The coupling assembly according to claim 1, wherein the contact region is not configured to support a load of the wind turbine.

5. The coupling assembly according to claim 1, wherein the load transfer region is configured to support a load of the wind turbine.

6. The coupling assembly according to claim 1, wherein the first annular connection face has an elevation at the contact region configured to be hit against by the driving unit.

7. The coupling assembly according to claim 1, wherein the first annular connection face has an inclined surface to protect the first insertion hole from being damaged by the driving unit.

8. The coupling assembly according to claim 7, wherein the inclined surface is positioned radially inwards from the contact region.

9. The coupling assembly according to claim 7, wherein the inclined surface is a load transfer region configured to support the load of the wind turbine.

10. The coupling assembly according to claim 1, wherein the second coupling part further comprises a recess aligned with the contact region.

11. The coupling assembly according to claim 1, wherein there is a gap between the first coupling part and the second coupling part at the contact region when the second coupling part is connected to the first coupling part.

12. The coupling assembly according to claim 1, wherein the second coupling part further comprises a chamber configured to protect the second insertion hole.

13. A tower end of a tower of a wind turbine connected to the second coupling part of the coupling assembly according to claim 1.

14. A method of driving a monopile of a wind turbine into the ground, a top end of the monopile being connected to the first coupling part of the coupling assembly according to claim 1, the method comprising:
positioning the driving unit on the contact region of the first coupling part; and
hitting the driving unit against the contact region of the first coupling part to drive the monopile into the ground.

15. A coupling assembly for connecting a tower or a transition piece of a wind turbine to a monopile comprising:
a first coupling part configured to be connected to the monopile, the first coupling part having a first annular connection face and an inclined first insertion hole being configured to be inserted by a fastener, wherein the first annular connection face has a primary circle comprising an annular arrangement of inclined openings of inclined first insertion holes forming an insertion hole circle, and a secondary circle comprising an annular arrangement of inclined openings of first insertion holes forming another insertion hole circle, the primary circle and the secondary circle being at a different radius from an axis of the wind turbine; and
a second coupling part configured to be connected to the first coupling part, the second coupling part having a second annular connection face configured to abut the first annular connection face of the first coupling part, wherein the second coupling part further comprises an inclined second insertion hole being configured to be inserted by the fastener,
wherein the first annular connection face comprises a contact region and a load transfer region, the contact region being a region of the first annular connection face between the primary circle and the secondary circle and aligned with a shell of the monopile where a driving unit hits against the first coupling part to drive the monopile into the ground during an installation of the monopile, the load transfer region being a region of the first annular connection face where loads are transferred from the second coupling part to the first coupling part;
wherein the contact region is a different region of the first annular connection face from the load transfer region;
wherein the second coupling part is divided into a plurality of pieces stacked on top of each other in a vertical direction.

16. The coupling assembly according to claim 15, wherein the first annular connection face has at least two load transfer regions, the contact region being positioned radially between both load transfer regions.

17. The coupling assembly according to claim 15, wherein the first annular connection face has an elevation at the contact region configured to be hit against by the driving unit.

18. A method of driving a monopile of a wind turbine into the ground, a top end of the monopile being connected to the first coupling part of the coupling assembly according to claim 15, the method comprising:
positioning the driving unit on the contact region of the first coupling part; and
hitting the driving unit against the contact region of the first coupling part to drive the monopile into the ground.

19. A tower end of a tower of a wind turbine connected to the second coupling part of the coupling assembly according to claim 15.

* * * * *